United States Patent [19]
Mueller et al.

[11] Patent Number: 6,111,923
[45] Date of Patent: *Aug. 29, 2000

[54] SYSTEM AND METHOD FOR CALCULATING A STATE TRANSITION METRIC IN A VITERBI EQUALIZER

[75] Inventors: Bruce Dale Mueller; David Edward Borth, both of Palatine; Kevin Lynn Baum, Hoffman Estates, all of Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/600,562

[22] Filed: Feb. 13, 1996

Related U.S. Application Data

[63] Continuation of application No. 07/779,749, Oct. 21, 1991, abandoned.

[51] Int. Cl.[7] ............................... H03D 1/00; H04L 27/06
[52] U.S. Cl. ......................... 375/341; 375/262; 371/43.8
[58] Field of Search .................................. 375/229, 232, 375/233, 259, 261, 262, 265, 266, 316, 340, 341, 346, 348; 329/364; 371/43.7, 43.8

[56] References Cited

U.S. PATENT DOCUMENTS

| | | |
|---|---|---|
| 4,484,338 | 11/1984 | Clark et al. . |
| 4,545,054 | 10/1985 | Davis ......................................... 371/43 |
| 4,606,027 | 8/1986 | Otano ......................................... 371/43 |
| 4,631,737 | 12/1986 | Qureshi ..................................... 375/14 |
| 4,885,757 | 12/1989 | Provence ................................... 375/96 |
| 4,995,104 | 2/1991 | Gitlin . |
| 5,029,186 | 7/1991 | Maseng et al. . |
| 5,063,573 | 11/1991 | Langewellpott . |
| 5,124,551 | 6/1992 | Borth et al. ............................ 375/12 X |
| 5,204,874 | 4/1993 | Falconer et al. ........................ 375/200 |

FOREIGN PATENT DOCUMENTS

0453814 A2  10/1991   European Pat. Off. .

OTHER PUBLICATIONS

*In Re Hiroyuki Iwashashi, Yoshiki Nishioka and Mitsuhiro Hakaridani,* 888 F. 2d 1370, 12 U.S.P.Q. 2D (BNA) 1908, (Court of Appeals for Federal Circuit 1989).

G. David Forney, Jr., "The Viterbi Algorithm", Proceedings of the IEEE, vol. 61, No. 3, Mar. 1973, pp 268–278.

Gottfried Ungerboeck, "Adaptive Maximum–Likelihood Receiver for Carrier–Modulated Data–Transmission Systems", IEEE Transactions on Communications, vol. COM–22 No. 5, May 1974, pp 624–636.

*Primary Examiner*—Chi H. Pham
*Assistant Examiner*—Bryan Webster
*Attorney, Agent, or Firm*—Randall S. Vaas; Robert H. Kelly; Michael C. Soldner

[57] ABSTRACT

A system and method for calculating survivor metrics in a Viterbi equalizer of a receiver, such as a receiver operative to receive a PSK-modulated signal, for example, a π/4, differential, phase-shift-keying, modulated signal. The state transition metric, defined as a function of two successive states, is converted into a function defined by pairwise differences between allowable symbols of a PSK-modulated signal. When operative to receive the π/4 DQPSK-modulated signal, the number of calculations required to calculate state transition metrics is reduced significantly.

20 Claims, 3 Drawing Sheets

SYSTEM AND METHOD FOR CALCULATING A STATE TRANSITION METRIC IN A VITERBI EQUALIZER

This is a continuation of application Ser. No. 07/779,749, filed Oct. 21, 1991 and now abandoned, which

BACKGROUND OF THE INVENTION

The present invention related generally to receiver circuitry of a receiver operative to receive a phase modulated signal, and, more particularly, to a system, and associated method, for calculating a state transition metric in a Viterbi equalizer and an equalizer circuit incorporating such which forms a portion of the receiver.

A communication system is operative to transmit information (referred to hereinbelow as an "information signal") between two or more locations, and includes a transmitter and a receiver interconnected by a transmission channel. Information is transmitted by the transmitter to the receiver upon the transmission channel. A radio communication system is a communication system in which the transmission channel comprises a radio-frequency channel wherein the radio-frequency channel is defined by a range of frequencies of the electromagnetic frequency spectrum.

The transmitter forming a portion of radio communication system includes circuitry for converting the information signal which is to be transmitted into a form suitable for transmission thereof upon the radio-frequency channel. Such circuitry is referred to as modulation circuitry which performs a process referred to as modulation. In such a process, the information signal is impressed upon a radio-frequency electromagnetic wave wherein the radio-frequency electromagnetic wave is a frequency within the range of frequencies defining the radio-frequency channel upon which the information signal is to be transmitted. The radio-frequency electromagnetic wave is commonly referred to as the "carrier signal", and the radio-frequency electromagnetic wave, once modulated by the information signal, is commonly referred to as the modulated signal.

Various modulation schemes are known for impressing the information signal upon the carrier signal to form the modulated signal.

One such modulation scheme is phase modulation in which the information signal is impressed upon the carrier signal in a manner to cause the phase of the carrier signal to be altered corresponding to the information content of the information signal. Phase changes of the modulated signal thereby form the information content of the modulated signal. Proper detection of the phase of the modulated signal permits recreation of the information signal.

A related modulation scheme is differential phase modulation in which differential phase changes of the modulated signal (i.e., phase differences between adjacent portions of the modulated signal) form the information content of the modulated signal. Proper detection of differential phase changes of the modulated signal permits recreation of the information signal.

Radio communication systems are advantageous in that no physical interconnection is required between the transmitter and the receiver; once the information signal is modulated to form the modulated signal, the modulated signal may be transmitted over large distances.

A cellular, communication system is one type of radio communication system. Radio telephone operative in such a cellular, communication system contain circuitry permitting simultaneous generation and reception of modulated signals, to permit thereby two-way communication between the radio telephones and remotely-located transceivers. These remotely-located transceivers, commonly referred to as "base stations", are physically connected to conventional telephonic networks to permit communication between a radio telephone and a fixed location of the conventional telephonic network.

A cellular, communication system is formed by positioning numerous base stations at spaced-apart locations throughout a geographical area. Each base station contains circuitry to receive modulated signals transmitted thereto by one, or many, radio telephones, and to transmit modulated signals to the one, or many, radio telephones. A frequency band (in the United States, extending between 800 MHz and 900 MHz) is allocated for radio telephone communication upon a cellular, communication system.

The positioning of each of the base stations forming the cellular, communication system is carefully selected to ensure that at least one base station is positioned to receive a modulated signal transmitted by a radio telephone positioned at any location throughout the geographical area.

Because of the spaced-apart nature of the positioning of the base stations, portions of the geographical area throughout which the base stations are located are associated with individual ones of the base stations. Portions of the geographical area proximate to each of the spaced-apart base stations define "cells" wherein the plurality of cells (each associated with a base station) together form the geographical area encompassed by the cellular, communication system. A radio telephone positioned within the boundaries of any of the cells of the cellular, communication system may transmit, and receive, modulated signals to, and from, at least one base station.

As the base stations and radio telephones of the cellular, communication system contain circuitry to permit continuous and uninterrupted communication between the radio telephone and a base station associated with a cell in which the radio telephone is positioned as the radio telephone is moved between cells, communication upon a cellular, communication system is particularly advantageous by one operating a radio telephone when travelling in an automotive vehicle.

Increased popularity of communication upon a cellular, communication system has resulted, in some instances, in the full utilization of every available channel of the frequency band allocated for cellular, radio telephone communication. As a result, various ideas have been proposed to utilize more effectively the frequency band allocated for radio telephone communications. By more efficiently utilizing the frequency band allocated for radio telephone communication, the transmission capacity of an existing cellular, communication system may be increased.

One such proposal permits two or more radio telephones to share a single transmission channel. When the two or more radio telephones transmit or receive signals over a single transmission channel, the capacity of an existing cellular, communication system may be doubled. While the signals transmitted from, or to, the radio telephones which share the same transmission channel can not be simultaneously transmitted (simultaneous transmission would cause signal overlapping, thereby preventing signal detection of either of the signals), the signals can be transmitted in intermittent bursts. By encoding an information signal into discrete form (to form, e.g., a discrete, binary data stream) and modulating the discretely-encoded signal generated by such encoding process, the resultant modulated signal may be transmitted in intermittent bursts. Such modulated signals may be recreated by the receiver to determine thereby the information content of the transmitted signal.

A modulation technique suitable for modulating the discretely-encoded information signal upon a carrier signal is the aforementioned, differential, phase modulation technique. More particularly, a specific, differential modulation technique, a $\pi/4$ differential, phase-shift-keying (DQPSK) modulation technique has been selected as the standard modulation technique for cellular, communication systems of increased capacity in the United States.

Encoding of an information signal into a discrete binary data stream is also advantageous as noise introduced upon the modulated signal during transmission thereof upon the transmission channel may be more easily detected and removed when the information signal is comprised of a discrete binary data stream than when the information signal is comprised of a conventional, analog signal.

Distortion occurring as a result of intersymbol interference during transmission of a modulated signal comprises of a discretely-encoded, information signal (and modulated by the $\pi/4$ DQPSK modulation technique above-noted) may be removed by equalizer circuitry forming a portion of the receiver circuitry. The equalizer may, for instance, comprise a maximum likelihood sequence estimator (MLSE) such as that described in an article entitled "Adaptive Maximum-Likelihood Receiver For Carrier-Modulated Data-Transmission System", by Gottfried Ungerboeck in the IEEE Transaction On Communication, Volume COM-22, No. 5, May 1974.

The MLSE disclosed therein is comprised of a matched filter and a Viterbi equalizer. Both the matched filter and the Viterbi equalizer may be implemented by an algorithm embodied in processor circuitry.

A modulated signal received by the receiver is demodulated by the modulator circuitry, and then applied to the matched filter of the MLSE. The matched filter generates a filtered signal which is supplied to the Viterbi equalizer. The Viterbi equalizer is operative to correct for distortions of the signal caused by intersymbol interference during transmission thereof upon a frequency channel.

The Viterbi equalizer determines maximum likelihood paths which are representative of a sequence of symbols which are most likely to occur. The number of possible paths of the Viterbi algorithm is related, not only to the number of allowable symbol levels of the modulated signal (in the instance of a $\pi/4$ DQPSK signal, each symbol may be of eight different levels), but is also exponentially related to the number of symbols in a sequence of symbols. Because of this exponential relationship, the number of calculations required of the Viterbi equalizer to determine a maximum likelihood path becomes quite significant. Such a significant number of required calculations is time-consuming and significant processing time is required of the Viterbi equalizer to make a proper determination.

A Viterbi equalizer of reduced complexity requiring less processing time to make a proper determination of maximum likelihood paths would, accordingly, be desirable.

SUMMARY OF THE INVENTION

The present invention, accordingly, provides a system, and associated method for calculating a state transition metric in a Viterbi equalizer of reduced complexity.

The present invention further advantageously provides a radio transceiver having a system, and an associated method, for calculating state transition metrics in a Viterbi equalizer forming a portion of a radio receiver.

The present invention provides further advantages and features, the details of which will become more evident when reading the following detailed description of the preferred embodiments hereinbelow.

In accordance with the present invention, therefore, a system, and associated method for determining a state transition metric in a Viterbi equalizer forming a portion of a radio receiver operative to receive a signal formed of a plurality of symbols, wherein the state transition metric is defined as a function of two successive states. Each state of the two successive states is defined in terms of sets of symbols of allowable symbols of a phase-shift-keying modulation scheme. The state transition metric, defined as the function of the two successive states is converted into a state transition metric defined as a function of pairwise differences between allowable symbols of the constellation set of the allowable symbols of the phase-shift-keying modulation scheme.

BRIEF DESCRIPTION OF THE DRAWINGS

The present invention will be better understood when read in light of the accompanying drawings in which.

DESCRIPTION OF THE PREFERRED EMBODIMENTS

Figure 1:
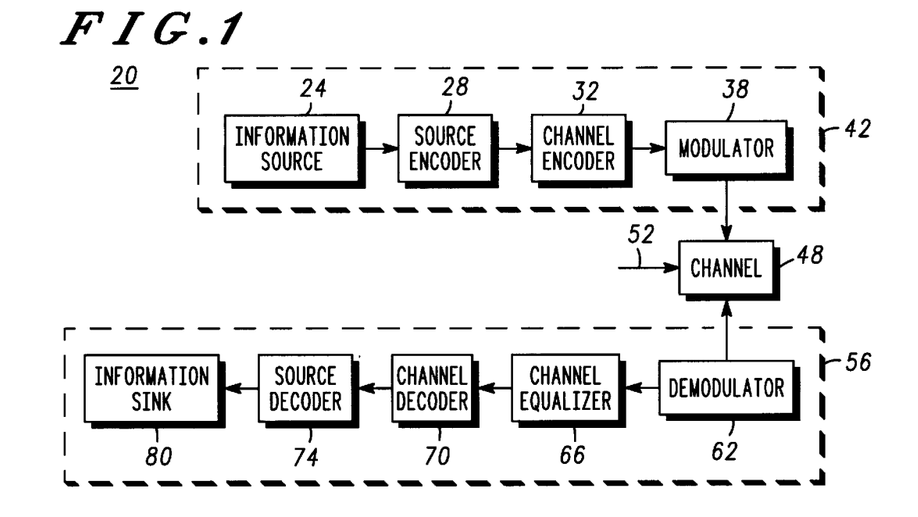
FIG. 1 is a block diagram of a communication system operable to transmit and to receive a modulated signal.

Referring first to the block diagram of FIG. 1, a communication system, referred to generally by reference numeral 20, is shown. Communication system 20 is operable to transmit and to receive digitally-encoded information signals. An analog information source, here represented by block 24, is representative of the source of an information signal, such as, for example, a voice signal or a data signal. In instances in which information source 24 is comprised of a voice signal, information source 24 includes a transducer, or other suitable circuitry, for converting the voice signal into an electrical signal of a desired characteristic.

The information signal generated by analog information source 24 is supplied to source encoder 28. Source encoder 28 converts the information signal supplied thereto by information source 24 into a digital signal according to an encoding scheme.

The digital signal generated by source encoder 28 is supplied to channel encoder 32. Channel encoder 32 encodes the digital signal supplied thereto according to a coding technique, such as, for example, a block and/or convolutional coding technique. Channel encoder 32 is operative to increase the redundancy of the digital signal supplied thereto by source encoder 28. By increasing the redundancy of the digital signal, distortion of a signal transmitted upon a frequency channel is less likely to result in erroneous interpretation of the information content of the information signal generated by information source 24.

The encoded signal generated by channel encoder 32 is supplied to modulator 38. Modulator 38 is operative to modulate the encoded signal supplied thereto according to a modulation technique.

In the preferred embodiment of the present invention, modulator 38 is operative to modulate the signal supplied thereto according to a differential-encoding modulation scheme, and, in particular, to form a π/4 DQPSK-modulated signal. It is noted, however, that the teachings of the present invention may be advantageously utilized in any receiver operative to receive a signal modulated by a phase-shift-keying modulation scheme.

Information source 24, source encoder 28, channel encoder 32, and modulator 38 together comprise the transmitter, designated by reference numeral 42, and illustrated by a block, shown in hatch, of communication system 20.

Modulator 38 generates a modulated signal, here, again, preferably a π/4 DQPSK-modulated signal, which is transmitted upon a frequency channel, here indicated by block 48. Typically, the channel upon which the modulated signal is transmitted is not noise-free, but, rather, distortion caused by noise (indicated in the figure by arrow 52) and intersymbol interference result in distortions of the modulated signal generated by transmitter 42.

The modulated signal transmitted by transmitter 42 upon frequency channel 48 is received by a receiver 56, here indicated by a block, shown in hatch. Receiver 56 represents a receiver which incorporates the system and method of the present invention.

The received signal received by receiver 56 is applied to demodulator 62 which forms a portion of receiver 56. Demodulator 62 demodulates the received signal by a process which is essentially the reverse of the process by which modulator 38 of the transmitter 42 generates the modulated signal.

Demodulator 62 generates a demodulated signal which is supplied to channel equalizer 66. Channel equalizer 66 is operative to correct for distortions to the signal transmitted upon frequency channel 48, and incorporation the system of the present invention.

Channel equalizer 66 generates an equalized signal which is supplied to channel decoder 70. Channel decoder 70 corresponds to encoder 32 of transmitter 42 of system 20, but functions to decode the equalized (but still encoded) signal supplied thereto by channel equalizer 66.

Channel decoder 70 generates a decoded signal which is supplied to source decoder 74. Source decoder 74 converts the signal supplied thereto into a form suitable for application to information sink 80. Information sink 80 may, for example, comprise an ear piece or speaker portion of a receiver, or another such transducer for converting the electrical signal comprising the decoding signal generated by source decoder 74 into human perceptible form.

The blocks representing demodulator 62, channel equalizer 66, channel decoder 70, source decoder 74, and information sink 80 are pictured within the block designating receiver 56 to represent thereby that the respective circuitry of block 62–80 together comprise the receiver.

Figure 2A:
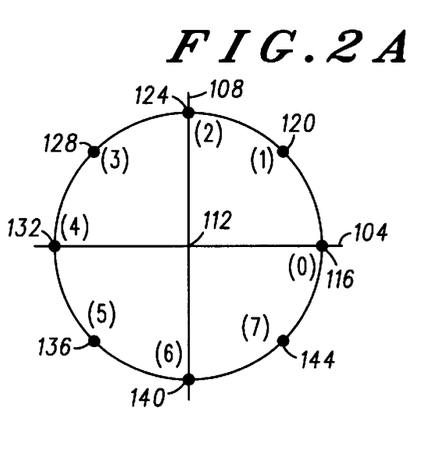
FIG. 2A is a graphical representation illustrating the allowable symbols of a $\pi/4$ DQPSK signal.

Turning now to the graphical representation of FIG. 2A, the constellation set of a π/4 differential, quarternary, phase-shift-keying (DQPSK) signal is graphically represented. The constellation set is plotted upon an axis system formed of abscissa axis 104 and ordinate axis 108 wherein the two axes intercept at origin 112. Abscissa axis 104 is scaled in terms of cos (ωt) and ordinate axis 108 is scaled in terms of sin (ωt). The variable ω refers to angular frequency, and the variable t refers to a quantity of time. Abscissa and ordinate axes 104 and 108 are oftentimes referred to as real and imaginary axes, respectively.

The symbol set comprised of symbol values which together form the constellation set of the π/4 DQPSK signal are represented by points 116, 120, 124, 128, 132, 136, 140, and 144 positioned equidistantly about a unit circle extending about origin 112. When axes 104 and 108 are referred to as the real and imaginary axes, respectively, each point 116–144 may be represented by a magnitude and a phase. Because the magnitude of each point 116–144 is identical (due to the positioning of the respective points 116–144 at identical distances from origin 112 upon the unit circle), each point 116–144 may be represented solely by a phase. The eight points comprising the symbol set of π/4 DQPSK, because of the equidistant spacings thereof about origin 112 are spaced apart from one another by an angular phase of forty-five degrees. In terms of radians, therefore, point 116 may be referred to as the zero symbol, point 120 may be referred to as the π/4 symbol, point 124 may be referred to as the π/2 symbol, point 128 may be referred to as the 3π/4 symbol, point 132 may be referred to as the π symbol, point 136 may be referred to as the 5π/4 symbol, point 140 may be referred to as the 3π/2 symbol, and point 144 may be referred to as the 7π/4 symbol. In a differential-encoding scheme, the information content of a modulated signal is contained in the differential phase changes between adjacent symbols.

Points 116–144 may also be designated by numbers 0–7, i.e., point 116 may be designated by "0", point 120 may be designated by "1", point 124 may be designated by "2", etc.

Accordingly, in π/4 DQPSK modulation scheme, the phase changes between adjacent symbols of the modulated signal form the information content of the signal. Allowable phase changes between adjacent symbols of a π/4 DQPSK signal are defined to be +/−π/4, and +/−3π/4. When modulator 38 of transmitter 42 forms a π/4 DQPSK, modulated signal, each symbol of the modulated symbol is of a phase corresponding to one of the phases defining points 116–144, and, adjacent symbols of the resultant, modulated signal are offset in phase by a phase as above-defined.

Figure 2B:
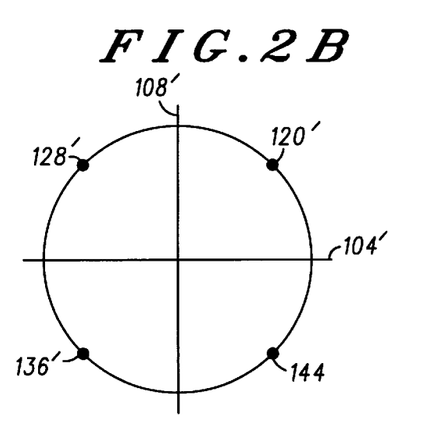
FIG. 2B is a graphical representation illustrating the allowable symbols of a QPSK signal.

FIG. 2B is a graphical representation, similar to that of FIG. 1A, but which illustrates points forming the constellation set formed of allowable symbol values of a quarternary phase-shift-keying (QPSK) modulated signal. The axis system is again comprised of abscissa and ordinate axes, here designated by reference numerals 104' and 108', which are scaled in terms of cos(ωt) and sin(ωt), respectively. Four points, here points 120', 128', 136', and 144', are located upon a unit circle centered at origin defined by the axis system 104'–108", and spaced equidistantly from one another upon the unit circle. Points 120'–144' are oftentimes represented in terms of their phase locations, as is conventional.

The system and method of the present invention may be utilized when receiving any phase-shift-keying (PSK) modulated signal, including the modulation schemes having allowable symbol values represented in FIGS. 2A–2B. As noted hereinabove, a particular PSK-modulation scheme, a π/4 DQPSK modulation scheme, is of particular significance as such modulation scheme has been selected as the standard modulation technique for cellular, communication systems of increased capacity in the United States of America.

Accordingly, the following description describes the system and method of the present invention, first with regard to a general PSK modulation scheme, and, second, with regard to a π/4 DQPSK modulation scheme.

General Phase-Shift-Keying Modulation Scheme

With respect again to the block diagram of FIG. 1, transmitter 42, having modulator 38 operative to modulate the signal supplied thereto according to a PSK modulation scheme, transmits a signal which may be represented by the following equation:

$$x(t) = \sum_n \alpha_n f(t - nT) \tag{1}$$

where:

$\alpha_n = e^{j2\pi d_n/k}$;

$d_n$ in the above exponential is a differentially-encoded data symbol having values $\{0, 1, \ldots k-1\}$ (corresponding to numerical values assigned to the points of the constellation set defined by the allowable symbol values of the PSK modulation scheme—e.g., in the modulation scheme illustrated in FIG. 2A, k=8; and in the modulation scheme illustrated in FIG. 2B, k=4); and f(t) is the value of a transmitted, equivalent base band pulse of a binary signal applied to modulator 38. The sequence of symbols represented by equation (1) form the symbol values of the symbols comprising the modulated signal.

The signal received by receiver 56, after transmission thereof upon transmission channel 48, may be represented by the following equation:

$$y(t) = \sum_n \alpha_n h(t - nT) + w(t) \tag{2}$$

where:

h(t)=g(t)*f(t)—i.e., the convolution of the transmitted equivalent based band pulse and the complex, low-pass-filter equivalent, impulse response of a multipath channel comprising transmission channel 48; and w(t) is a time-varying value representation of additive white, gaussian noise (AWGN).

Channel equalizer 66 of receiver 56 is preferably comprised of a maximum likelihood sequence estimator (MLSE), as above-noted. As noted hereinabove, an MLSE is comprised of a matched filter and a Viterbi equalizer.

The matched filter of the MLSE computes a value, referred to as a sufficient statistic $z_n$, which may be represented mathematically by the following equation:

$$z_n = g_{MF}(t) * y(t)|_{t=nT} = \sum_l \alpha_{n-l} s_l + r_n \tag{3}$$

where:

$g_{MF}(t)$ is the impulse response of the matched filter;

y(t) is the received signal (as above defined);

$r_n$ is the noise sequencer; and $$s_1 = g_{MF}(t) * h(t)|_{t=nT} = s_{-1}^* \tag{4}$$

The terms of $s_1$ are oftentimes referred to as the elements of a channel autocorrelation function of the channel upon which the modulated signal is transmitted.

It is also noted that the impulse response of the matched filter, $g_{MF}(t)$ is also equal to the time-inverse, complex conjugate of h(t), i.e., $$g_{MF}(t) = h^*(-t) \tag{5}$$

The MLSE is operative to determine, as the sequence most likely to have been transmitted, the sequence $[\alpha_n]$ that maximizes the value of metric equations, referred to as survivor metrics, $J_n(\sigma_n)$ between the state $\{\sigma_{n-1}\}$ and state $\sigma_n$ according to the following equation:

$$J_n(\sigma_n) = 2\text{Re}(\alpha_n * z_n) + \max_{\{\sigma_{n-1}\} \to \sigma_n} \{J_{n-1}(\sigma_{n-1}) - F(\sigma_{n-1}, \sigma_n)\} \tag{6}$$

where $F(\sigma_{n-1}, \sigma_n)$ is defined to be a state transition metric governed by the following equation:

$$F(\sigma_{n-1}, \sigma_n) = \alpha_n * s_0 \alpha_n + 2\text{Re}\left(\alpha_n * \sum_{l=1}^{L} s_l \alpha_{n-l}\right) \tag{7}$$

where $\sigma_n = \{d_{n-L+1} \ldots d_n\}$; and

L is the memory of the channel in numbers of symbols. It is noted that the state transition metric $F(\sigma_{n-1}, \sigma_n)$ is a function of two successive states $\sigma_{n-1}$ and $\sigma_n$.

The Viterbi equalizer of the MLSE is operative to generate values of the survivor metric $J_n(\sigma_n)$. It is noted that in the PSK modulation scheme, the magnitude of $\alpha_n$ is, or can be normalized to be, 1, i.e., $|\alpha_n|=1$. Accordingly, the equation defining the survivor metric $J_n(\sigma_n)$ may be rewritten as the following:

$$J_n(\sigma_n) = \text{Re}(\alpha_n * z_n) + \max_{\{\sigma_{n-1}\} \to \sigma_n} \{J_{n-1}(\sigma_{n-1}) - F(\sigma_{n-1}, \sigma_n)\} \tag{8}$$

where $$F(\sigma_{n-1}, \sigma_n) = \text{Re}\left(\alpha_n * \sum_{l=1}^{L} s_l \alpha_{n-l}\right) \tag{9}$$

When the memory of the channel, in the number of symbols is set at an acceptable value, this equation may be further simplified. The memory of the channel is related, and is proportional to, the signal delay upon a multi-path channel in which intersymbol interference may result in relative delay times of the transmitted signal upon different paths of the multi-path channel. A memory of two symbols (i.e., when L=2) is considered to be acceptable for accurate reception of the transmitted signal for radiotelephones operative in United States Digital Cellular systems. When L=2, the state transition metric $F(\sigma_{n-1},\sigma_n)$ may be rewritten by the following equation:

$$F(\sigma_{n-1},\sigma_n)=Re\{\alpha_n{}^*\alpha_{n-1}\,s_1+\alpha_n{}^*\alpha_{n-2}\,s_2\} \quad (10)$$

Conventionally, then, calculation of the state transition metric, F, when the state transition metric is defined to be a function of two successive states, and L=2, requires $k^3$ calculations to be performed for each determination, as $F(\sigma_{n-1}, \sigma_n)$ must be calculated for all combinations of $\alpha_n$, $\alpha_{n-1}$, $\alpha_{n-2}$.

Careful examination of the preceding equation defining the state transition metric, F, permits further simplification of the number of calculations required to determine such value. By defining variables a, b, and c to be of values taken from the set of $\{0, \ldots k-1\}$ (i.e., the numerical values) assigned to the phase constellation points of the constellation set defined by the allowable symbol values of the PSK modulation scheme, and the states at any two points in time $\sigma_{n-1}$, and $\sigma_n$ may be defined as follows:

$$\sigma_{n-1}=e^{j2\pi c/k}\cdot e^{j2\pi b/k} \quad (11)$$

$$\sigma_n=e^{j2\pi b/k}\cdot e^{j2\pi a/k} \quad (12)$$

where:

a, b, and c are elements of the set $\{0, \ldots k-1\}$.

Each term $e^{j2\pi c/k}$, $e^{j2\pi b/k}$, and $e^{j2\pi a/k}$ represents a symbol of the constellation set.

The above-equation defining the state transition metric, F, may be rewritten as follows:

$$F(\sigma_{n-1},\sigma_n)=Re\{e^{j2\pi(b-a)/k}\,s_1+e^{j2\pi(c-a)/k}\,s_2\} \quad (13)$$

It is noted that, by rewriting the equation defining the state transition metric, F, in this manner, the state transition metric becomes a function of pairwise differences between symbols of the constellation set of allowable symbol values.

Here, for L=2, two pairwise differences are defined, and the set of pairwise differences, Z, is defined as follows:

$$Z=\{(b-a),(c-a)\}. \quad (14)$$

The value (c–a) may be rewritten as c–b+b–a or (c–b)+ (b–a). Accordingly, the above equation may also be rewritten as:

$$F(\sigma_{n-1},\sigma_n)=F\{(c-b),(b-a)\}=Re\{e^{j2\pi(b-a)/k}s_1+e^{j2\pi[(c-b)+(b-a)]/k}s_2\} \quad (15)$$

Hence, the values of the state transition metric, $F(\sigma_{n-1}, \sigma_n)$, is a function of only the constellation phase transitions (c–b) and (b–a)—i.e., the state transition metric, F, is a function of pairwise differences between allowable symbol values of the constellation set.

More generally, the equation $\Delta$ may be defined as follows:

$$\Delta_i=e^{j2\pi/kZ}L-i+1[S_{L-i+1}\Delta_{i-1}] \quad (16)$$

with an initial condition of:

$$\Delta_0=0$$

where:

Z is a set of pairwise differences between allowable symbols of a PSK modulation scheme;

L is the memory of the channel in the number of symbols; and

S is an element of a channel autocorrelation function.

As an example, the following is an expansion of $\Delta$ when L=3. When L=3, Z, the set of pairwise differences may be defined as follows:

$$Z=\{(b-a),(c-b),(d-c)\}. \quad (17)$$

In general, $F(\sigma_{n-1},\sigma_n)=F(Z)=Re(\Delta_L)$. So, for L=3, $\Delta_3$ is as follows:

$$\Delta_3=e^{j2\pi(b-a)/k}[S_1+\Delta_2] \quad (18)$$

By expanding the term $\Delta_2$, $\Delta_3$ may be further expanded:

$$\Delta_3=e^{j2\pi(b-a)/k}[S_1+e^{j2\pi(c-b)/k}[S_2+\Delta_1]]. \quad (19)$$

And, by expanding the term $\Delta_1$, $\Delta_3$ may be still further expanded:

$$\Delta_3=e^{j2\pi(b-a)/k}[S_1+e^{j2\pi(c-b)/k}\,[S_2+S_3 e^{j2\pi(d-c)/k}]] \quad (20)$$

Figure 2C:
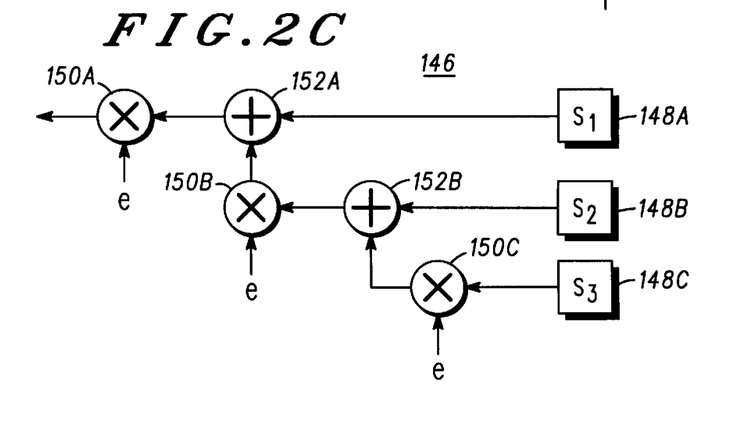
FIG. 2C is a block diagram representation of the recursive function formed of the pairwise differences defining the state transition metric according to a preferred embodiment of the present invention.

$\Delta$ is a recursive function, and may be pictorially illustrated. FIG. 2C illustrates the function when L=3, as expanded to form equation (20) above. The recursive function, referred to generally by reference numeral 146, is comprised of values of the elements of the channel autocorrelation function, denoted by blocks 148A, 148B, and 148C, respectively, multiplier elements 150A, 150B, and 150C, and summation elements 152A and 152B. The recursive function formed for other values of L may be also represented in a similar manner.

II/4 DQPSK Modulation Scheme

Figure 3:
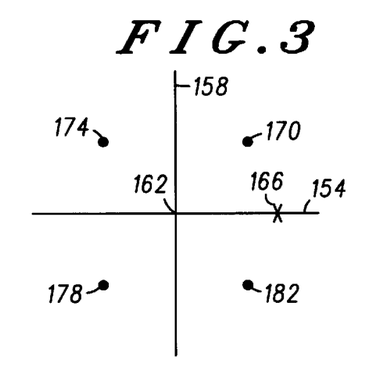
FIG. 3 is a graphical representation illustrating the relationship between adjacent symbols of a $\pi/4$ DQPSK modulation scheme.

Turning now to the graphical representation of FIG. 3, the relationship between adjacent symbols of a π/4 DQPSK modulation scheme is illustrated. Similar to the axis system defined in the graphical representation of FIG. 2A, abscissa and ordinate axes, here axes 154 and 158, respectively, intercept at an origin, here origin 162. A symbol having a phase of zero radians, here denoted by "X" 166 is plotted upon abscissa axis 154. A symbol transmitted subsequent to symbol 166 and immediately adjacent thereto, is offset in phase relative to symbol 166 by a phase as above defined (i.e., +/–π/4 or +/–3π/4 radians).

Graphically, the next-state symbol must be offset in phase relative to the phase of symbol 166. In particular, and according to the above-described scheme, a symbol transmitted subsequent to transmission of symbol 166 must be of a phase corresponding to symbols 170, 174, 178, or 182. It is noted that symbol 166 is plotted upon axis 154, and each possible subsequently-transmitted symbol is offset in phase, and is not of a phase which is plotted upon one of the axes 154 or 158. Similarly, if symbol 166 were, alternately, of a phase such that symbol 166 would be plotted upon ordinate axis 158, the possible subsequently-transmitted symbols would similarly be plotted at a location offset of the axes 154 and 158.

Figure 4:
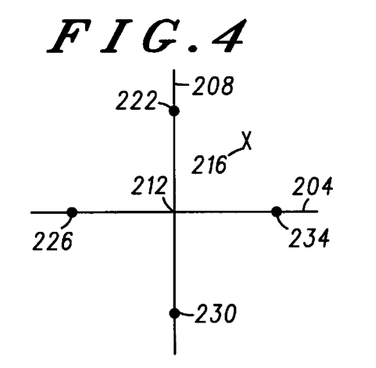
FIG. 4 is a graphical representation, similar to that of FIG. 3, which also illustrates the relationship between adjacent symbols of a $\pi/4$ DQPSK modulation scheme.

Turning now to the graphical representation of FIG. 4, the relationship between adjacent symbols of the π/4 DQPSK, modulation scheme is again illustrated. Similar to axis system defined in the graphical representation of FIG. 3, abscissa and ordinate axes, here axes 204 and 208, respectively, intersect at an origin, here origin 212. A symbol having a phase of π/4 radians, here denoted by "X" 216 is plotted upon the axis system 204–208. A symbol transmitted subsequent to symbol 216, and immediately adjacent thereto, is offset in phase relative to symbol 216 by a phase as above-defined. Graphically, the next-state symbol must be offset in phase relative to the phase of symbol 216. In particular, and according to the above-described scheme, a symbol transmitted subsequent to transmission of symbol 218 must be of a phase corresponding to symbol 222, 226, 230, or 234.

It is noted that symbol 216 is plotted offset from both axes 204 and 208, and each possible, subsequently-transmitted symbol is offset in phase and is of a phase which is plotted upon one of the axes 204 and 208. Similarly, if symbol 216, alternately, were of a phase corresponding to any of the other symbol values offset in phase relative to axes 204 and 208, the possible subsequently-transmitted symbol would similarly be plotted at locations upon one of the axes 204 or 208.

Figure 5:
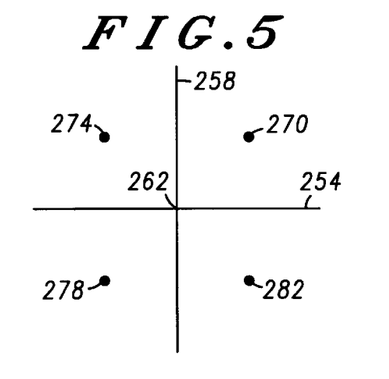
FIG. 5 is a graphical representation, which illustrates a first subset of symbols of the allowable symbol values of a $\pi/4$ DQPSK signal.

FIG. 5 is a graphical representation which, similar to the graphical representations of the preceding figures, is defined by an axis system formed of mutually-perpendicular axes, here axes 254 and 258 which intersect at an origin, here origin 262. Points 270, 274, 278, and 282 are representative of four of the allowable symbol values of a π/4 DQPSK modulated signal. Points 270–282 correspond to points 170–182 of FIG. 3. Points 270–282 are therefore representative of the possible, subsequently-transmitted symbols which can be transmitted immediately adjacent to transmission of a symbol which would be represented by a point on one of the axes 254 or 258.

Figure 6:
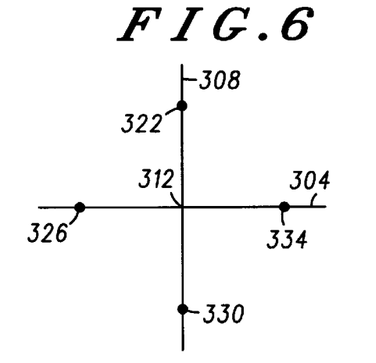
FIG. 6 is a graphical representation which illustrates a second subset of symbols of the allowable symbol values of a $\pi/4$ DQPSK signal.

FIG. 6 is a graphical representation which, similar to the graphical representations of the preceding figures, is defined by an axis system formed of mutually-perpendicular axes, here axes 304 and 308 which intersect at an origin, here origin 312. Points 322, 326, 330, and 334 are representative of four of the allowable symbol values of a π/4 DQPSK modulated signal, and hence, form a subset thereof. Points 322–334 are therefore representative of the possible, subsequently-transmitted symbols immediately adjacent to transmission of a symbol which would be represented by a point offset from one of the axes 304 or 308.

As mentioned previously, a Viterbi equalizer is operative to determine a maximum likelihood path which is representative of a sequence of symbols which are most likely to occur. The Viterbi equalizer is typically formed of an algorithm (a Viterbi algorithm) embodied within processing circuitry. However, a hardware implementation of such an equalizer is, of course, also possible.

With reference to the block diagram of communication system 20 of FIG. 1, the Viterbi equalizer typically forms a portion of channel equalizer 66 which generates an equalized (i.e., a decoded) signal. Operation of a Viterbi equalizer is oftentimes represented pictorially by a trellis in which allowable states of a signal are represented as elements of vertically-extending columns. The allowable states of adjacent time periods are similarly pictorially represented by similar, vertically-extending columns.

The allowable states of each time period are defined by sets of symbols of the allowable symbol values of a modulation scheme. In a simplest embodiment, the sets of symbols are each defined by a single symbol. In more complex embodiments, the sets of symbols are each defined by two symbols (or in some embodiments, more than two symbols). A Viterbi equalizer in which the allowable states are defined by sets of two symbols is said to have a memory of two symbols.

A collection of vertically-extending columns, each representative of the possible symbol values of a symbol at any interval in time forms an array; such an array is commonly referred to as the trellis of the Viterbi equalizer.

With respect again to the block diagram of FIG. 1, transmitter 42, having modulator 38 operative to modulate the signal supplied thereto according to a π/4 DQPSK modulation scheme, transmits a signal which may be represented by the following equation:

$$x(t) = \sum_n a_n f(t - nT) \tag{21}$$

where:

$a_n = e^{j2\pi d_n/8};$ $d_n$ in the above exponential is a differentially-encoded data symbol having values 0–7 (corresponding to the numerical values assigned to points 116–144 of FIG. 2); and f(t) is the value of a transmitted, equivalent base band pulse of a binary signal applied to modulator 38. The sequence of symbols, represented by equation (21), above form the symbol values of the symbols comprising the modulated signal.

The signal received by receiver 56, after transmission thereof upon transmission channel 48, may be represented by the following equation:

$$y(t) = \sum_n a_n h(t - nT) + w(t) \tag{22}$$

where:

h(t)=g(t)*f(t)—i.e., the convolution of the transmitted equivalent based band pulse and the complex, low-pass-filter equivalent, impulse response of a multipath channel comprising transmission channel 48; and w(t) is a time-varying value representative of additive white, gaussian noise (AWGN).

Figure 7:
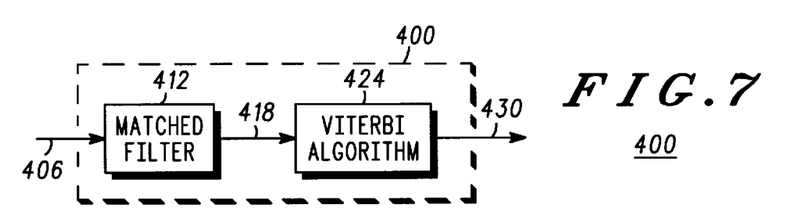
FIG. 7 is a block diagram of a maximum likelihood sequence estimator comprising a channel equalizer of a receiver of a preferred embodiment of the present invention.

Channel equalizer 66 of receiver 56 is preferably comprised of a maximum likelihood sequence estimator (MLSE), as above-noted. FIG. 7 is a block diagram of a MLSE, denoted by reference numeral 400, which comprises channel equalizer 66 of the preferred embodiment of the present invention. MLSE 400 receives a sequence of symbols on line 406 which are supplied to matched filter 412. Matched filter 412 generates a processed signal on line 418 which is supplied to Viterbi equalizer 424. Viterbi equalizer 424 generates an equalized (i.e., decoded) signal on line 430. The signal generated on line 430 is provided to channel decoding circuitry, represented in FIG. 1 by channel decoder 70. It is noted that MLSE 400 represents an equalizer of a preferred embodiment. The system of the present invention may similarly be embodied in equalizers of other designs.

Matched filter 412 of MLSE 400 computes a value, referred to as a sufficient statistic $z_n$, which may be represented mathematically by the following equation:

$$z_n = g_{MF}(t) * y(t)|_{t=nT} = \sum_l a_{n-l} s_l + r_n \tag{23}$$

where:

$g_{MF}(t)$ is the impulse response of the matched filter;

y(t) is the received signal (as above defined);

$r_n$ is a noise sequence; and $$s_1 = g_{MF}(t) * h(t)|_{t=nT} = s_{-1}^* \quad (24)$$

The terms of $s_1$ are oftentimes referred to as the elements of a channel autocorrelation function of the channel upon which the modulated signal is transmitted.

It is also noted that the impulse response of the matched filter, $g_{MF}(t)$ is also equal to the time-inverse, complex conjugate of h(t), i.e., $$g_{MF}(t) = h^*(-t) \quad (25)$$

MLSE 400 is operative to determine, as the sequence most likely to have been transmitted, the sequence $[\alpha_n]$ that maximizes the value of metric equations, referred to as survivor metrics, $J_n(\sigma_n)$ between the states $[\sigma_{n-1}]$ to state $\sigma_n$ according to the following equation:

$$J_n(\sigma_n) = 2\text{Re}(\alpha_n * z_n) + \max_{\{\sigma_{n-1}\} \to \sigma_n} \{J_{n-1}(\sigma_{n-1}) - F(\sigma_{n-1}, \sigma_n)\} \quad (26)$$

where $F(\sigma_{n-1}, \sigma_n)$ is defined to be a state transition metric governed by the following equation:

$$F(\sigma_{n-1}, \sigma_n) = \alpha_n * s_0 \alpha_n + 2\text{Re}\left(\alpha_n * \sum_{l=1}^{L} s_1 \alpha_{n-1}\right) \quad (27)$$

where $\sigma_n = \{d_{n-L+1} \ldots d_n\}$; and

L is the memory of the channel in numbers of symbols.

It is noted that the state transition metric $F(\sigma_{n-1}, \sigma_n)$ is a function of two successive states $\sigma_{n-1}$ and $\sigma_n$.

Viterbi equalizer 424 is operative to generate values of the survivor metric $J_n(\sigma_n)$. It is noted that in the $\pi/4$ DQPSK modulation scheme, the magnitude of an is 1, i.e., $|\alpha_n|=1$. Accordingly, the equation defining the survivor metric $J_n(\sigma_n)$ may be rewritten as the following:

$$J_n(\sigma_n) = \text{Re}(\alpha_n * z_n) + \max_{\{\sigma_{n-1}\} \to \sigma_n} \{J_{n-1}(\sigma_{n-1}) - F(\sigma_{n-1}, \sigma_n)\} \quad (28)$$

where $$F(\sigma_{n-1}, \sigma_n) = \text{Re}\left(\alpha_n * \sum_{l=1}^{L} s_1 \alpha_{n-1}\right) \quad (29)$$

When the memory of the channel, in the number of symbols, is set as an acceptable value, this equation may be further simplified. The memory of the channel is related, and proportional to, the signal delay upon a multi-path channel in which intersymbol interference may result in a delay time of the transmitted signal. Typically, a delay of two symbols (i.e., when L=2) is less than the delay time of a signal transmitted upon a multipath channel. When L=2, the state transition metric $F(\sigma_{n-1}, \sigma_n)$ may be rewritten by the following equation:

$$F(\sigma_{n-1}, \sigma_n) = \text{Re}\{\alpha_n * \alpha_{n-1} s_1 + \alpha_n * \alpha_{n-2} s_2\} \quad (30)$$

Conventionally, the state transition metric, F, in a $\pi/4$ DQPSK modulation scheme, requires sixty-four ($4^3$) calculations to be performed for each determination, as $\alpha_n, \alpha_{n-1}, \alpha_{n-2}$ may each take on any of four values.

Careful examination of the preceding equation defining the state transition metric, F, permits further simplification of the number of calculations required to determine such value. By defining variables a, b, and c to be of values taken from the set of [0, 1, 2, 3, 4, 5, 6, 7,] (i.e., the numerical values assigned to the phase constellation points 116–144 of the constellation set of FIG. 2), and the symbol values at any two points in time $\sigma_{n-1}$, and $\sigma_n$ may be defined as follows:

$$\sigma_{n-1} = e^{j2\pi c/8} \cdot e^{j2\pi b/8} \quad (31)$$

$$\sigma_n = e^{j2\pi b/8} \cdot e^{j2\pi a/8} \quad (32)$$

where:

a, b, and c are elements of the set $\{0, 1, 2, 3, 4, 5, 6, 7\}$.

Each term $e^{j2\pi c/8}$, $e^{j2\pi b/8}$, and $e^{j2\pi a/8}$ represents a symbol of the constellation set shown in FIG. 2A.

The above-equation defining the state transition metric, F, may be rewritten as follows:

$$F(\sigma_{n-1}, \sigma_n) = \text{Re}\{e^{j2\pi(b-a)/8} s_1 + e^{j2\pi(c-a)/8} s_2\} \quad (33)$$

It is noted that, by rewriting the equation defining the state transition metric, F, in this manner, the state transition metric becomes a function of pairwise differences between symbols of the constellation set of allowable symbol values.

The value (c–a) may be rewritten as c–b+b–a or (c–b)+(b–a). Accordingly, the above equation may also be rewritten as:

$$F(\sigma_{n-1}, \sigma_n) = F\{(c-b), (b-a)\} = \text{Re}\{e^{j2\pi(b-a)/8} s_1 + e^{j2\pi[(c-b)+(b-a)]/8} s_2\} \quad (34)$$

Hence, the values of the state transition metric, $F(\sigma_{n-1}, \sigma_n)$, is a function of only the constellation phase transitions (c–b) and (b–a)—i.e., the state transition metric, F, is a function of pairwise differences between allowable symbol values of the constellation set.

By defining Z to be: Z={(b–a), (c–b)}, equation (34) can be rewritten in terms of the previously noted recursive relation as:

$$F(Z) = \text{Re}(\Delta_2) \quad (35)$$

where:

$$\Delta_2 = e^{j2\pi(b-a)/8}[s_1 + \Delta_1]. \quad (36)$$

Again, as Z={(b–a), (c–b)}, equation (36) may also be rewritten as terms of the previously noted recursive relation as follows:

$$\Delta_2 = e^{j2\pi(b-a)/8}[s_1 + s_2 e^{j2\pi(c-b)/8}] \quad (37)$$

Figure 8:
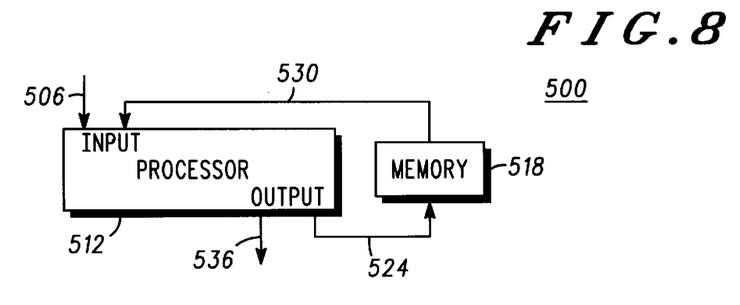
FIG. 8 is a block diagram of processor circuitry which comprises the Viterbi equalizer of a preferred embodiment of the present invention.

The above equations may be calculated by processor circuitry, such as processor circuitry 500, shown in block form in FIG. 8. Values of a received, demodulated signal are supplied on line 506 to input ports of processor 512. Processor 512 embodies appropriate algorithms to access memory 518 by way of line 524 coupled to output ports of processor 512. Appropriate lines, here denoted by line 530, interconnect memory 518 and processor 512. Processor 512 generates an output signal on line 536 representative of a value of a state transition metric, $F(\sigma_{n-1}, \sigma_n)$.

Equation (34) defines the state transition metric, F, in terms of only two values, which are pairwise differences between allowable symbols, as compared to the preceding, conventional equation (30) which defines the value of the state transition metric, $F(\sigma_{n-1}, \sigma_n)$, in terms of three variables. Hence, the number of required calculations to determine the value of a state transmission metric, F, is reduced by an order of magnitude. Here, in a $\pi/4$ DQPSK modulation scheme only sixteen calculations ($4^2$) are required to determine a value of a state transition metric, $F(\sigma_{n-1}, \sigma_n)$.

As the variables a, b, and c are representative of three consecutive symbols (in time) of a π/4 DQPSK constellation set, differences between any two adjacent ones of the three consecutive variables are odd values. Also, differences between alternating ones of the variables are even values. That is to say, (c−a) is an even value, and (b−a) is an odd value.

With reference again to Equation (37), it is noted that the multiplicand (i.e., the terms outside of the brackets), because the (b−a) term is odd, has both real and imaginary, nonzero components forming the complex value.

Computational simplification may be obtained by rearranging terms of equation (37) to form a multiplicand having only real or imaginary values. Equation (37) may be rewritten as follows:

$$F\{(c-b), (b-a)\}=Re[e^{j2\pi(c-a)/8}\{s2+e^{j2\pi(b-c)/8} s_1\}] \quad (38)$$

Examination of this equation permits an even greater reduction in the number of computations required to calculate a value of a state transition metric, $F(\sigma_{n-1}, \sigma_n)$. In a π/4 DQPSK modulation scheme, the terms in brackets represent only four, possible complex values. Hence, the state transition metric, F(c−b, b−a), consists of four values which may be rotated by π/2 radians. This is equivalent to calculating either the plus/minus real, or plus/minus imaginary portions of the portion of the equation in brackets.

A variable, to be denoted by Λ, may be substituted for the terms in the inner bracket of equation (38). Therefore, Λ may be defined as:

$$\Lambda i = s2 + s1\ e^{-2\pi i/8} \quad (39)$$

where i=c−b.

By substitution, then, equation 38 may be rewritten as follows:

$$F\{(c-b), (b-a)\}=Re[e^{j2\pi(c-a)/8} \Lambda_{c-b}] \quad (40)$$

Upon examination of equation (40), it can be shown that, because the difference (c−a) is even, that the exponential term is either a real value of imaginary value. Such value is multiplied by the Λ term (which is complex). The real portion of the resultant product is therefore only one side, or the other, of the resultant product.

Namely, for each of the four differences of (c−a)—i.e., c−a=0, 2, 4, or 6—four different values of F{(c−b), (b−a)} are possible. For (c−a)=0, F{(c−b), (b−a)}=Re[Λ$_{c-b}$]. For (c−a)=2, F{(c−b), b−a)}=−Im[Λ$_{c-b}$]. For (c−a)=4, F{(c−b), (b−a)}=−Re[Λ$_{c-b}$]. And for (c−a)=6, F{(c−b), (b−a)}=+Im[Λ$_{c-b}$].

Figures 9, 10:
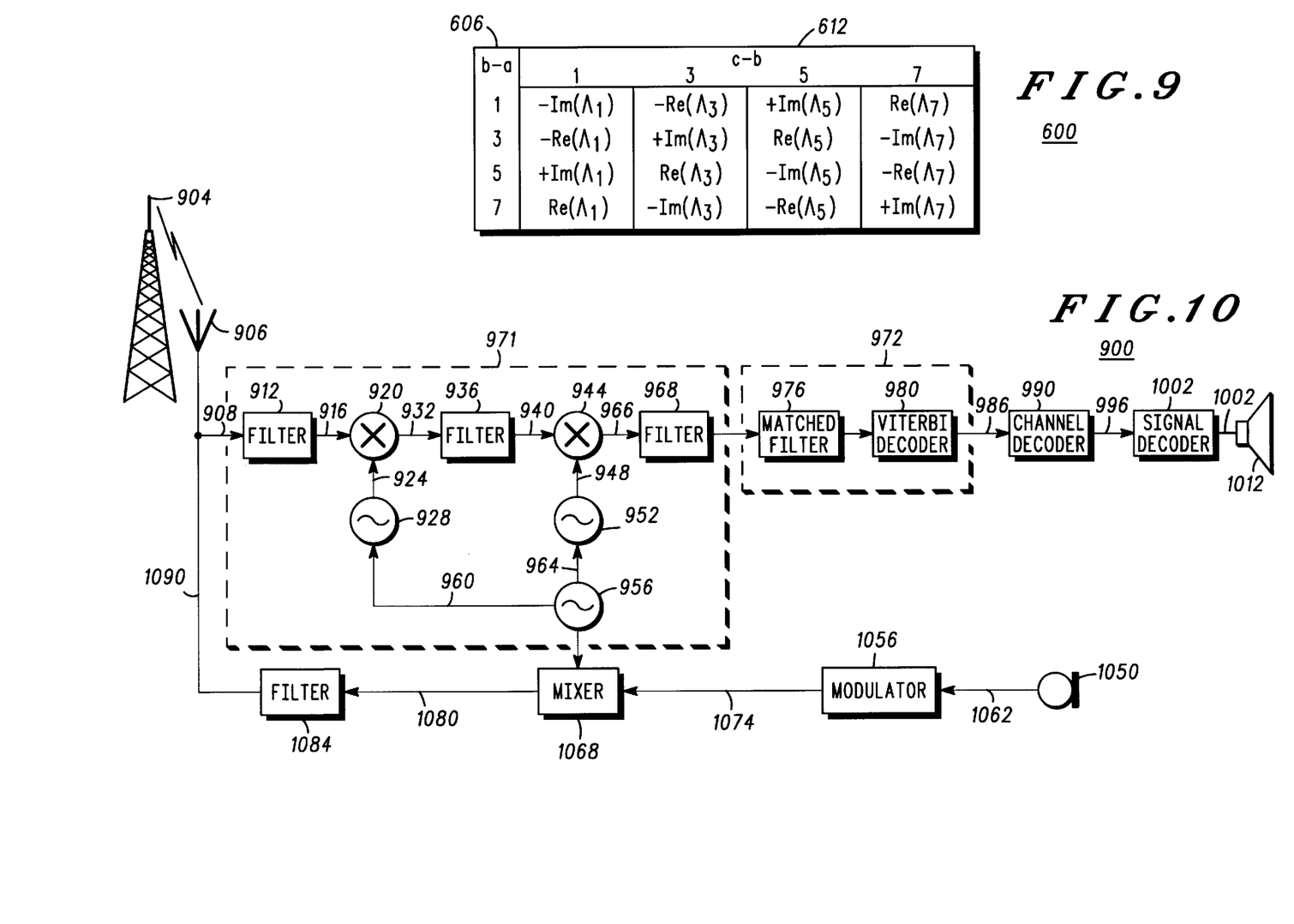
FIG. 9 is a table listing allowable values of which the state transition metric may be comprised in a Viterbi equalizer of an alternate embodiment of the present invention.
FIG. 10 is a block diagram of a transceiver constructed according to the teachings of the present invention.

Accordingly, the possible, allowable values of the state transition metric, F, may be stored in a table in memory, similar to the table, referred to generally by reference numeral 600, illustrated in FIG. 9. Column 606 formed at the left-hand side of table 600 and row 612 formed at the top side of table 600 together define an array comprising sixteen elements. As both the differences (b−a) and (c−b) are odd values, column 606 and row 612 take only the odd values of differences between symbols (namely, the values of 1, 3, 5, and 7).

As the sixteen possible values that the state transition metric, F, may take are merely the real or imaginary values of the values of four symbols, computations required to calculated the value of the state transition metric, F, is even further reduced.

As the state transition metric is required to be calculated each time in which a survivor metric is to be determined, and a survivor metric is to be determined each time in which a symbol is received by a receiver (and a symbol is received by a receiver on the order of 24,000 times per second), any reduction in the number of calculations required to calculate the state transition metric, $F(\sigma_{n-1}, \sigma_n)$, greatly reduces the complexity of the Viterbi equalizer and a MLSE comprised thereof. The method and system reduces the number of calculations required to calculate a value of the state transition metric by an order of magnitude. And, the method and system can further reduce the required number of calculations by an additional order of magnitude.

Turning finally to the block diagram of FIG. 10, a transceiver, referred to generally by reference numeral 900, constructed according to the teachings of the present invention is shown.

A signal transmitted by a transmitter, here indicated by antenna 904, is transmitted upon a transmission channel, and received by antenna 906 of the transceiver. A signal indicative of the signal perceived by antenna 906 is generated on line 908 and supplied to filter 912. A signal indicative of the signal received by antenna 904 is generated on line 908 and supplied to filter 912. Filter 912 generates a filtered signal on line 916 which is supplied to first down-mixed circuit 920. Mixer circuit 920 additionally receives an oscillating signal on line 924 which is generated by oscillator 928.

Mixer circuitry 920 generates a down-mixed signal in line 932 which is supplied to filter 936. Filter 936 generates a filtered signal on line 940 which is supplied to second down-mixer 944. Second down-mixer 944 also receives an oscillating signal in line 948 generated by oscillator 952. The oscillating frequencies of oscillator 928 and 952 are preferably, and as illustrated, controlled by the oscillating frequency of oscillator 956 by way of their respective connections thereto on lines 960 and 964.

Second down-mixer 944 generates a signal on line 948 which is supplied to filter 952. Filter 952 generates a filtered signal on line 956.

The elements together denoted by reference numerals 908–956 together comprise demodulator 960 which is denoted in the Figure by a block, shown in hatch.

The signal generated on line 956 is supplied to equalizer 972. As illustrated, equalizer 972 is comprised of matched filter 976 and Viterbi algorithm 980. Equalizer 972 incorporates the features of the Viterbi equalizer described with respect to the preceding Figures to form the maximum likelihood sequence estimator shown in FIG. 7. Equalizer 972 generates an equalized signal on line 986 which is supplied to decoder 990. Decoder 990 generates a decoded signal on line 996 which is supplied to voice decoder 1002. Voice decoder 1002 generates a decoded on line 1008 which is supplied to a transducer, here speaker 1012.

The block diagram of transceiver 900 further illustrates transmit-portion of transceiver. The transmit-portion of transceiver is shown to comprise generally transducer 1050, such as a microphone, which is coupled to modulator 1056 by way of line 1062, mixer 1068 which is coupled to receive the modulated signal generated by modulator 1056 on line 1074. Circuitry of mixer 1068 also receives oscillating signals generated by reference oscillator 956, here indicated by connection of mixer 1068 and oscillator 1056 by way of line 1074. Mixer 1068 generates a mixed signal on line 1080 which is supplied to filter 1084. Filter 1084 and filter 912 may, for example, comprise a conventional duplexer. Filter 1084 generates a filtered signal on line 1090 which is coupled to antenna 906 to transmit a signal therefrom. Because the Viterbi algorithm of equalizer 972 is less complex than equalizers of conventional construction, processing time required to generate an equalized signal on line 986 is reduced.

While the present invention has been described in connection with the preferred embodiment shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A method for a Viterbi equalizer forming a portion of a receiver operative to receive a signal comprised of a sequence of symbols transmitted to the receiver upon a transmission channel by a transmitter wherein each symbol of the sequence of symbols comprising the signal is of a symbol value corresponding to symbol value of a symbol of a set of allowable symbols of a phase-shift-keying modulation scheme, said method for determining a maximum likelihood path representative of a sequence of symbols generated by the transmitter prior to transmission thereof upon the transmission channel, said method comprising the steps of:

calculating a state transition metric as a function of pairwise differences between allowable symbols of the phase-shift-keying modulation scheme; and determining a survivor metric formed as a function of the state transition metric wherein the survivor metric corresponds to the maximum likelihood path.

2. A radio comprising:

a receiver for receiving a signal comprised of a sequence of symbols transmitted to the receiver upon a transmission channel by a transmitter, wherein each symbol of the sequence of symbols comprising the signal is of a symbol value corresponding to a symbol value of a symbol of a set of allowable symbols of a phase-shift-keying modulation scheme; and a Viterbi equalizer for determining a maximum likelihood path representative of a sequence of symbols generated by the transmitter prior to transmission thereof upon the transmission channel, the Viterbi equalizer calculating a state transition metric as a function of pairwise difference between allowable symbols of the phase-shift-keying modulation scheme and determining a survivor metric as a function of said state transition metric wherein the survivor metric corresponds to the maximum likelihood path.

3. A method for operating a radio, comprising the steps of:

receiving a signal comprised of a sequence of symbols transmitted to the receiver upon a transmission channel by a transmitter, wherein each symbol of the sequence of symbols comprising the signal is of a symbol value corresponding to a symbol value of a symbol of a set of allowable symbols of a phase-shift-keying modulation scheme; and equalizing, by a Viterbi equalizer, the signal to determine a maximum likelihood path representative of a sequence of symbols generated by the transmitter prior to transmission thereof upon the transmission channel, the step of equalizing comprising the steps of:

selectively adding and subtracting real and imaginary values derived from a channel autocorrelation function to calculate a state transition metric; and determining a survivor metric formed as a function of said state transmission metric wherein the survivor metric corresponds to the maximum likelihood path.

4. The method as defined in claim 3, wherein the state transition metric is calculated according to a recursive function by adding and subtracting.

5. A receiver comprising:

a demodulator receiving signals comprised of a sequence of symbols transmitted to the receiver upon a transmission channel by a transmitter, wherein each symbol is of a symbol value of a set of allowable symbols of a phase-shift-keying modulation scheme, the demodulator demodulating received signals; and an equalizer coupled to the demodulator to received demodulated signals therefrom and outputting corrected signals, the equalizer to selectively add and subtract real and imaginary values derived from a channel autocorrelation function to calculate state transition metrics and determining a survivor metric formed as a function of the state transition metrics, wherein the survivor metric corresponds to the maximum likelihood path such that it produces a data sequence of corrected data.

6. The receiver as defined in claim 5, where the state transition metric comprises a recursive function.

7. The radio of claim 2 wherein said circuitry to calculate calculates a state transition metric defined as a function of pairwise differences between allowable symbols of a quaternary phase-shift-keying modulation scheme.

8. The radio of claim 2 wherein said circuitry to calculate calculates a state transition metric defined as a function of pairwise differences between allowable symbols of a differential, quaternary phase-shift-keying modulation scheme.

9. The radio of claim 2 wherein the state transition metric, defined as the function of pairwise differences calculated by said circuitry to calculate comprises a recursive function.

10. The radio of claim 9 wherein the recursive function comprising the state transition metric comprises a number of recursive factors, said number of recursive factors comprising the recursive function being proportional to a number of pairwise differences defined between the allowable symbols of the phase-shift-keying modulation scheme.

11. The radio of claim 10 wherein the number of pairwise differences defined between the allowable symbols of the phase-shift-keying modulation scheme is no greater than a number of pairwise differences defined between allowable symbols of a quaternary phase-shift-keying modulation scheme.

12. The radio of claim 6, wherein the phase-shift-keying modulation scheme comprises a p/4 differential, quaternary, phase-shift-keying modulation scheme.

13. The radio of claim 12 wherein the recursive function is of a value corresponding to a real or imaginary portion of a recursive element comprising the recursive function.

14. The method of claim 1 wherein said step of calculating comprises the step of calculating a state transition metric defined as a function of pairwise differences between allowable symbols of a quarternary phase-shift-keying modulation scheme.

15. The method of claim 1 wherein said step of calculating comprises the step of calculating a state transition metric defined as a function of pairwise differences between allowable symbols of a differential, quarternary phase-shift-keying modulation scheme.

16. The method of claim 1 wherein the state transition metric calculated during said step of calculating comprising a recursive function.

17. The method of claim 16 wherein the recursive function comprising the state transition metric calculated during said step of calculating comprises a number of recursive factors, said number of recursive factors comprising the recursive function being proportional to a number of pairwise differences defined between the allowable symbols of the phase-shift-keying modulation system.

18. The method of claim 17 wherein the number of pairwise differences defined between allowable symbols of the phase-shift-keying modulation system is no greater than a number of pairwise differences defined between allowable symbols of a quaternary phase-shift-keying modulation scheme.

19. The method of claim 18, wherein the phase-shift-keying modulation scheme comprises a $\pi/4$ differential, quaternary, phase-shift-keying modulation scheme.

20. The method of claim 15 wherein the recursive function is of a value corresponding to a real or imaginary portion of a recursive element comprising the recursive function.

* * * * *